United States Patent [19]
St. Clair

[11] 3,756,628
[45] Sept. 4, 1973

[54] THREADED CONNECTION

[75] Inventor: Theodore A. St. Clair, Fairfield, Conn.

[73] Assignee: Textron Inc., Providence, R.I.

[22] Filed: Mar. 23, 1972

[21] Appl. No.: 237,351

Related U.S. Application Data

[63] Continuation-in-part of Ser. No. 224,127, Feb. 7, 1972, abandoned.

[52] U.S. Cl. ............... 285/52, 285/30, 285/173, 285/355, 285/357, 285/DIG. 16
[51] Int. Cl. ............................................. F16l 19/02
[58] Field of Search............... 285/333, 30, 52, 285/355, 357, 392, 173, DIG. 16; 73/201; 85/32 CS

[56] References Cited
UNITED STATES PATENTS

| | | | |
|---|---|---|---|
| 1,851,860 | 3/1932 | McKee | 285/30 |
| 3,462,539 | 8/1969 | Winston | 285/173 X |
| 2,439,685 | 4/1948 | Findley | 85/32 CS |
| 1,489,809 | 4/1924 | Austin | 85/32 CS |
| 3,146,142 | 8/1964 | Maly | 285/DIG. 16 |
| 1,859,311 | 5/1932 | McEvoy | 285/333 X |
| 2,407,552 | 9/1946 | Hoesel | 285/355 |
| 806,156 | 12/1905 | Marshall | 285/355 X |
| 3,101,207 | 8/1963 | Pavel et al. | 285/355 X |

Primary Examiner—Thomas F. Callaghan
Attorney—Arthur A. Johnson et al.

[57] ABSTRACT

A die-cast meter top has integral hubs provided with external screw threads to receive a thin sleeve of hard metal, such as steel, which is provided with an internal screw thread fitting said external screw thread on the hub, the sleeve having an external screw thread to receive the internal screw thread on a coupling nut. The sleeve is plastic coated, preferably fluidized bed coated with epoxy, and there is a coating of epoxy resin between the hub and the sleeve to secure the sleeve to the hub against movement and electrically insulate the sleeve from the hub for protection against galvanic corrosion.

1 Claim, 4 Drawing Figures

PATENTED SEP 4 1973  3,756,628
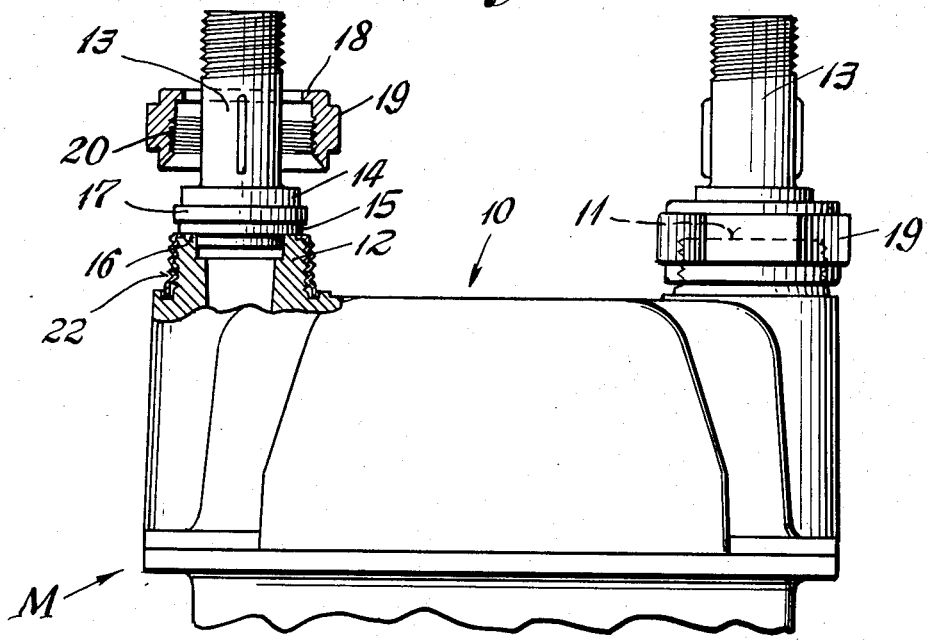
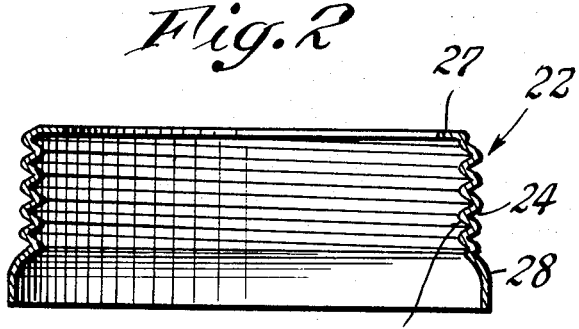
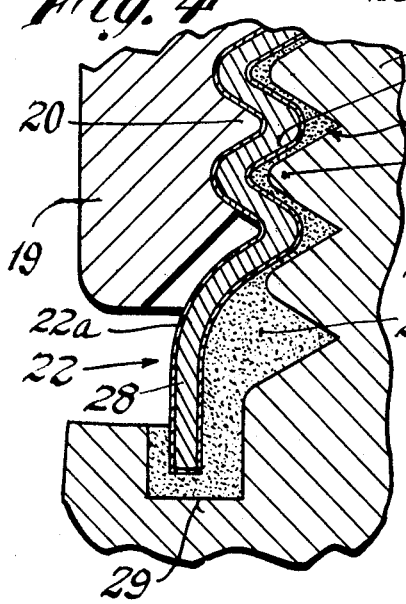
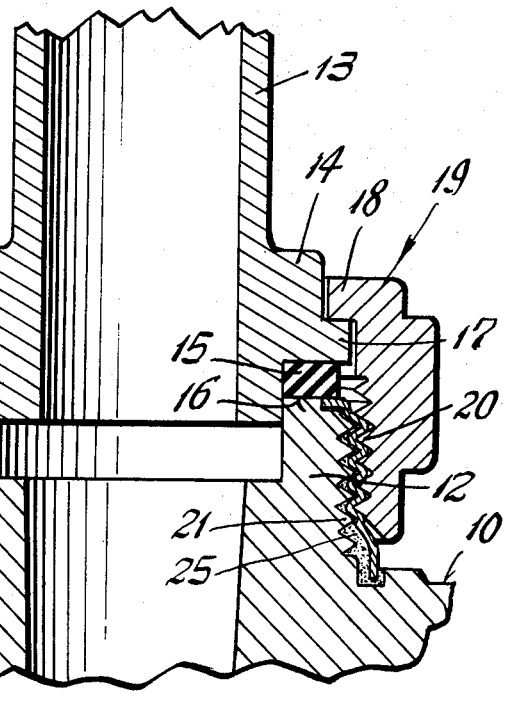

THREADED CONNECTION

This application is a continuation-in-part of my application Ser. No. 224,127, filed Feb. 7, 1972 and now abandoned.

This invention relates to the screw thread connections between a gas meter and inlet and outlet pipes.

Heretofore, when gas meters, or at least the tops thereof, were made of ferrous metal such as iron or steel, hubs integral with the top were provided with male screw threads to receive the female threads of the clamping nut of a coupling which was also made of ferrous metal and had internal screw threads to receive the external screw threads of the hub. Such connections were satisfactory.

But, when the top of the gas meter including the threaded hubs thereon was made of die-cast aluminum, the screw threads on the hubs were frequently damaged because of the ferrous threads on the nuts of the couplings cross-threading the threads on the aluminum hubs, thus preventing a gastight connection from being made between the coupling and the hub. The chances of cross-threading occurring were increased because the weight of the meter made it difficult to keep the hub and the coupling, particularly the nut, aligned when attaching a meter to an installed coupling.

One attempted solution of the problem was to install a steel hub in the meter top instead of die-casting the hub integral with the top. This solution was unsatisfactory because it increased the cost of the meter and its installation, and required a great deal of care to insure that the steel insert was firmly anchored and gastight to prevent gas leakage. Besides, the insert had to be plated to inhibit corrosion.

These problems and difficulties have been obviated by the present invention by still using the soft metal meter top with its integral die-cast housing and providing it with a suitable steel sleeve which may be made of sheet metal plated or plastic coated and having internal screw threads adapted to be received on the external screw threads of the hub, and external screw threads to engage the internal screw threads on the nut of a coupling member having the nipple to which the meter casing is to be attached.

In the form of the invention herein illustrated, before the sleeve is attached to the hub, there is applied to the external threaded surface of the hub or the internal threads of the sleeve or both a coating of epoxy resin or equivalent cementitious dielectric material which performs the dual function of securing the sleeve on the hub against removal and electrically insulating the aluminum hub from the ferrous metal sleeve.

The dielectric strength of the plastic coating on the sleeve and the epoxy adhesive between the sleeve and the hub provides sufficient electrical insulation between the coupling and the hub so that insulated nipples or couplings, which are costly need not be used.

The pitch diameters of the hub and the coupling nut are such as to accommodate between them the plastic coated sheet metal sleeve and the layer of epoxy resin thereon and, to keep the thickness of the sleeve to a minimum, the threads on the sleeve may be rolled, thus forming the external and internal threads at the same operation.

Also, it is preferable to round the crests of the screw threads on the hub so that they are more like the rolled threads of the sleeve.

Other features and advantages will hereinafter appear.

In the accompanying drawings:

FIG. 1 is an elevation of the top portion of a gas meter showing the hub on the left in section, the hub at the right having been connected to a nipple by the coupling.

FIG. 2 is a greatly enlarged vertical sectional view of the sleeve shown in FIG. 1.

FIG. 3 is a vertical sectional view showing the hub, sleeve and union on an enlarged scale.

FIG. 4 is an enlarged sectional view of a portion of the lower end of the nut and sleeve shown in FIG. 3.

As shown in the accompanying drawings, the present invention is applied to means for connecting inlet and outlet nipples to the top portion 10 of a gas meter M.

The top portion 10 has projecting from it hubs 11 and 12, the hub 12 being shown in section in FIG. 1, which are connected to nipples 13 by which the meter may be attached to inlet and outlet pipes, not shown, of a gas distribution system.

As shown in FIGS. 1 and 3, the nipple 13 is integral with a head 14 having on its end a resilient gasket 15 shaped to rest on the top surface 16 of the hub, and a flange 17 adapted to be engaged by a flange 18 on a ferrous metal nut 19 provided with internal screw threads 20.

Heretofore, the hubs 11 and 12 were each provided with an external screw thread to fit and receive the screw threads 20 of the nut 19 so that when applied and tightened down, the nipple 13 would be united to the hub 12 and a gastight connection between the meter and the nipple would be established. The flanges 18 of the nuts and the threaded connections on the nuts must be sufficiently strong to support the weight of the meter, if necessary, and therefore the nuts have been made of iron or steel.

When the top 10 of the meter and the hubs were made of aluminum, the use of the ferrous metal nut was not satisfactory because of the ease with which inadvertent cross-threading of the hub could occur, making it impossible thereafter to tighten down the coupling nut and tightly sealing the joint.

It was proposed to avoid these difficulties by installing a threaded steel hub in the die-cast top 10 to replace the die-cast hub but that arrangement added considerable cost to the manufacture of the meter and required great care to insure getting the steel hub firmly anchored in the top and the maintaining of a gastight connection.

According to the present invention, these difficulties are avoided at very small additional cost by die-casting the top 10 with integral hubs 11 and 12 and forming screw threads 21 on the exterior of the hubs and applying to each hub a thin hard metal sleeve 22 having an internal screw thread 23 fitting the screw thread 21 on the hub and an external screw thread 24 fitting the internal thread 20 on the nut 19.

According to the present invention in its broader aspect, the sleeve 22 is held on its hub by a coating of cementitious material, preferably a coating 25 of epoxy resin, which may be applied to either the hub or the sleeve 22 or both before the sleeve 22 is screwed on the hub. The coating 25 occupies the space between the threads 21 and 23 and, when it hardens or cures, securely attaches the sleeve to the hub against movement, for instance, by force which might be imparted to the sleeve when backing-off the nut for any reason.

Preferably the threads 23 and 24 on the sleeve 22 may be formed simultaneously by rolling a thin drawn steel blank, and the sleeve 22 may be plated to reduce corrosion and/or to allow smooth movement of the nut on the sleeve when making up the connection.

In a more specific aspect of the invention, it has been found advantageous to coat the entire surface of the sleeve 22 with dielectric plastic material which protects the sleeve from galvanic corrosion and electrically insulates the nut 19 from the sleeve 22 and the latter from the hub. The coating 22a of the sleeve may be efficiently accomplished by the use of the fluidized bed coating method.

While the screw threads 21 on the hub 12 may be standard V-shape in cross-section, it is preferable, as shown herein, to round-off the crests of the threads 21 so as to increase the spaces between the threads on the hub 12 and those on the sleeve 22 to receive the cementitious epoxy coating 25 and thus enhance the bond between these parts. The use of the rolled threads 23 and 24 is advantageous because the profiles of the threads 23 and 24 are somewhat rounded while those of the threads 21 on the hub are somewhat V-shape, thereby forming slight pockets 26 between the threads in which the resin may lie.

The pitch and root diameters of the threads 23 and 24 on the one hand and threads 20 and 21 on the other are made so that the parts may be plated or plastic coated and slidably fit.

The use of cementitious material, such as epoxy resin, not only anchors the sleeve 22 on the hub 12, but also helps insulate the aluminum hub from the plated or coated steel sleeve 22 to prevent corrosion due to electrolysis.

Preferably one end of the sleeve 22 has an inwardly extending flange 27 to partially overlie the top surface of the hub to be engaged by the resilient gasket 15 when the nut 19 is screwed on the sleeve to draw the head 14 on the nipple toward the hub. The other end of the sleeve 22 preferably has a downwardly flaring portion 28 which extends into a pocket or groove 29 at the base of the hub. When assembling the sleeve 22 on the hub 12 the groove 29 is filled with a bead of epoxy to secure the bottom of the sleeve to the hub and insulate the sleeve from the hub.

Variations and modifications may be made within the scope of the claims and portions of the improvements may be used without others.

I claim:

1. Threaded connecting means comprising a nipple having external screw threads at one end and a flange at the other end, a nut of hard metal having internal screw threads, and having a flange adapted to engage the flange on the nipple, a hub of soft metal having external screw threads, a thin sleeve of hard metal having external screw threads and internal screw threads interposed between said hub and said nut and threadably engaging said screw threads on said nut and on said hub respectively, said sleeve being coated with dielectric plastic material, an elastomeric washer between and electrically insulating said flange on the nipple and the top of the hub, the crest diameter of the screw threads on the hub being slightly less than that of the root diameter of said screw threads on the sleeve, the resulting spaces between the screw threads on the hub and the coated screw threads on the sleeve being filled with cementitious material, the hub having a bore in which a neck portion on the nipple extends.

* * * * *